United States Patent [19]
Sieg

[11] Patent Number: 5,956,190
[45] Date of Patent: Sep. 21, 1999

[54] ASTRONOMY GUIDE SCOPE MOUNTING SYSTEM

[76] Inventor: Brian T. Sieg, 2530 Corydon Pike, New Albany, Ind. 47150

[21] Appl. No.: 09/005,385

[22] Filed: Jan. 9, 1998

[51] Int. Cl.⁶ .............................. G02B 7/02; F41G 1/38
[52] U.S. Cl. ............................. 359/827; 359/829; 33/247
[58] Field of Search .................................... 359/819, 822, 359/827, 811, 818, 823, 798, 642

[56] References Cited

U.S. PATENT DOCUMENTS

| | | | |
|---|---|---|---|
| 745,110 | 11/1903 | Lallie | 359/429 |
| 2,424,011 | 7/1947 | DeGramont | 359/249 |
| 2,693,032 | 11/1954 | Braymer | 33/282 |
| 3,023,503 | 3/1962 | Baker | 33/299 |
| 3,074,315 | 1/1963 | Seibel et al. | 359/429 |
| 3,642,341 | 2/1972 | Seifried | 359/429 |
| 5,086,556 | 2/1992 | Klummp | 33/247 |
| 5,327,292 | 7/1994 | Eguchi | 359/827 |
| 5,363,559 | 11/1994 | McCarty | 33/246 |
| 5,396,487 | 3/1995 | Abe et al. | 359/819 |
| 5,457,577 | 10/1995 | Wilson | 359/827 |
| 5,537,262 | 7/1996 | Aoki et al. | 359/822 |

*Primary Examiner*—Georgia Epps
*Assistant Examiner*—Saeed Seyrafi
*Attorney, Agent, or Firm*—Tipton L. Randall

[57] ABSTRACT

A system for mounting a guide scope to a primary telescope is disclosed. The mounting system includes a mounting base member, a guide scope holder, and adjusting means between the mounting base member and the guide scope holder allowing horizontal and vertical adjustment of the holder relative to the mounting base member.

10 Claims, 2 Drawing Sheets

ASTRONOMY GUIDE SCOPE MOUNTING SYSTEM

FIELD OF THE INVENTION

The invention relates to a mounting system for a telescopic instrument, and more particularly to a mounting system for an astronomy guide scope attached to a larger telescopic instrument.

BACKGROUND OF THE INVENTION

In order to take good pictures of deep space objects through a telescope, the shutter of a camera attached to the eye piece of the instrument must remain open for a span of 15 minutes to 1 hour for each photo attempt. The rotation of the earth during this relatively long exposure time period causes the stars and other objects to appear to move across the sky. To overcome this problem, the primary photographing telescope is fitted with a mechanical drive device that maintains the image of the deep space object at the center of the camera lens. The drive device is best controlled by an on board computer connected to a secondary telescope, or guide scope, securely fastened to the primary telescope. With the primary telescope focused on the deep space object, a bright star near the object is selected as a reference point. The guide scope is focused on that bright star and the computer maintains the bright star in the center of the guide scope by means of the drive device, thus maintaining the image of deep space object at the center of the camera lens for the full exposure time.

It is important to maintain the guide scope and primary telescope in a constant orientation to allow proper tracking of the object to be photographed. Commercial mounting brackets for attaching the guide scope to the primary telescope are available, but there is little or no capacity for adjusting the orientation of the guide scope relative to the mounting bracket which is secured to the primary telescope. This situation causes difficulties when there is no bright star near the deep space object to be photographed. Thus there is a need for a mounting system which will allow both the horizontal and vertical axis of the guide scope to be changed without moving the primary telescope.

A number of optical mounting systems have been described, including a solar and vertical sighting attachment for transits in U.S. Pat. No. 745,110 by Lallie.

In U.S. Pat. No. 2,424,011 De Gramont discloses a telescope adjusting device where eccentrics 11 and 12 are rotated to adjust the azimuth and attitude of the scope held in the eccentrics and the spherical ball 5.

Braymer, in U.S. Pat. No. 2,693,032, describes a telescope mounting device which includes a hollow base for housing fragile parts of the instrument.

In U.S. Pat. No. 3,023,503 Baker discloses an adjustable V-block support for maintaining cylindrical objects in a horizontal orientation. The support includes a cup-shaped socket with multiple adjusting screws.

Seible et al., in U.S. Pat. No. 3,074,315, describes a reflecting attachment for telescopes where a prism mounted in front of the telescope is rotated to cause the telescope to locate points on both sides of the telescope.

In U.S. Pat. No. 3,642,341 Seifried discloses an optical aiming device for rifles which includes a telescopic sight held in a housing by springs and adjusted by set screws also held in the housing.

Eguchi, in U.S. Pat. No. 5,327,292, describes a lens barrel attachment including a camera lens holder having a click pin that inserts into a lens barrel indentation to hold lens and camera in a specific orientation.

In U.S. Pat. No. 5,396,487 Abe et al. disclose a system of a set screw and spacers used to hold and shift an optical article positioned in an instrument.

Wilson, in U.S. Pat. No. 5,457,577, describes a quick-set precision optical holder that employs two adjustment screws and a pressure pin mechanism to retain a lens within a mount ring.

In U.S. Pat. No. 5,537,262 Aoki et al. disclose a rotational torque setting apparatus for a screw mechanism used in an optical device such as a camera.

None of the above patents provide a mounting system that will allow both the horizontal and vertical axis of the guide scope to be changed without moving the primary telescope.

SUMMARY OF THE INVENTION

The invention is a guide scope mounting system comprising a mounting base member secured to a primary telescope, a guide scope holder for supporting a guide scope, and adjusting means between said mounting base member and said guide scope holder allowing horizontal and vertical adjustment of said guide scope holder relative to said mounting base member.

DESCRIPTION OF THE PREFERRED EMBODIMENTS INCLUDING A BEST MODE

Nomenclature

10 Guide Scope Mount
20 Base of the Mount
25 Planar Base Member
26 Top Surface of Base Member
27 Bottom Surface of Base Member
30 Control Mounting Blocks
31 Threaded Fasteners
32 Spacer Block
35 Primary Telescope Mounting Blocks
36 Primary Telescope Mounting Blocks Flat Surface
37 Primary Telescope Mounting Blocks Curved Surface
38 Mounting Apertures
39 Threaded Mounting Fasteners
40 Guide Scope Holder
45 Retainer Rings
50 Threaded Hold Down Screws
60 First Adjusting Means (Horizontal)
61 Retainer Ring Support Post
62 Aperture in Planar Base Member
63 Threaded Control Shaft
64 Horizontal Control Knob
70 Second Adjusting Means (Vertical)
71 Retainer Ring Support Post
72 Aperture in Planar Base Member
73 Threaded Control Shaft
74 Vertical Control Knob

Construction

Figure 1:
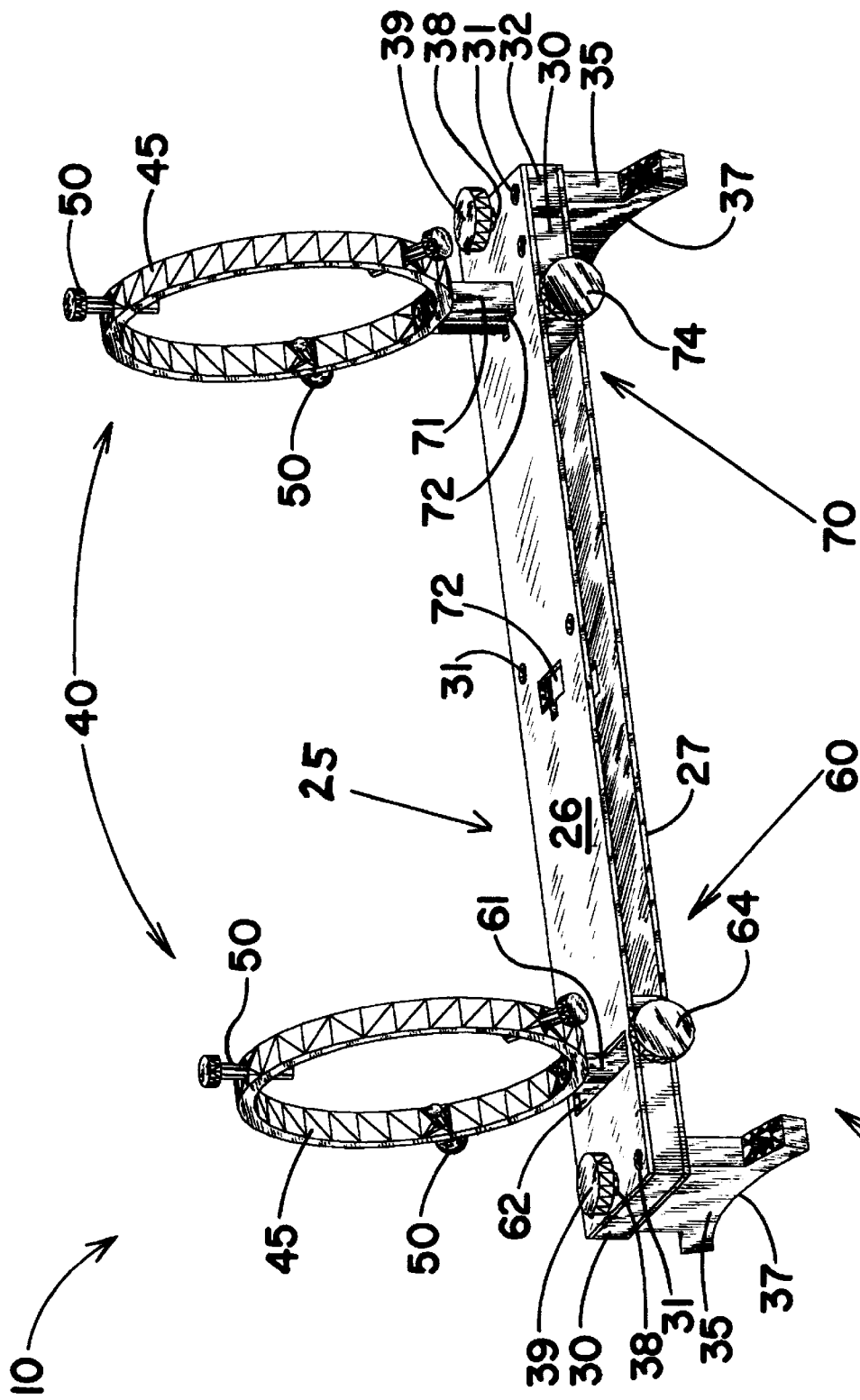
FIG. 1 is a perspective plan view of the guide scope mount of the present invention.
Figure 2:
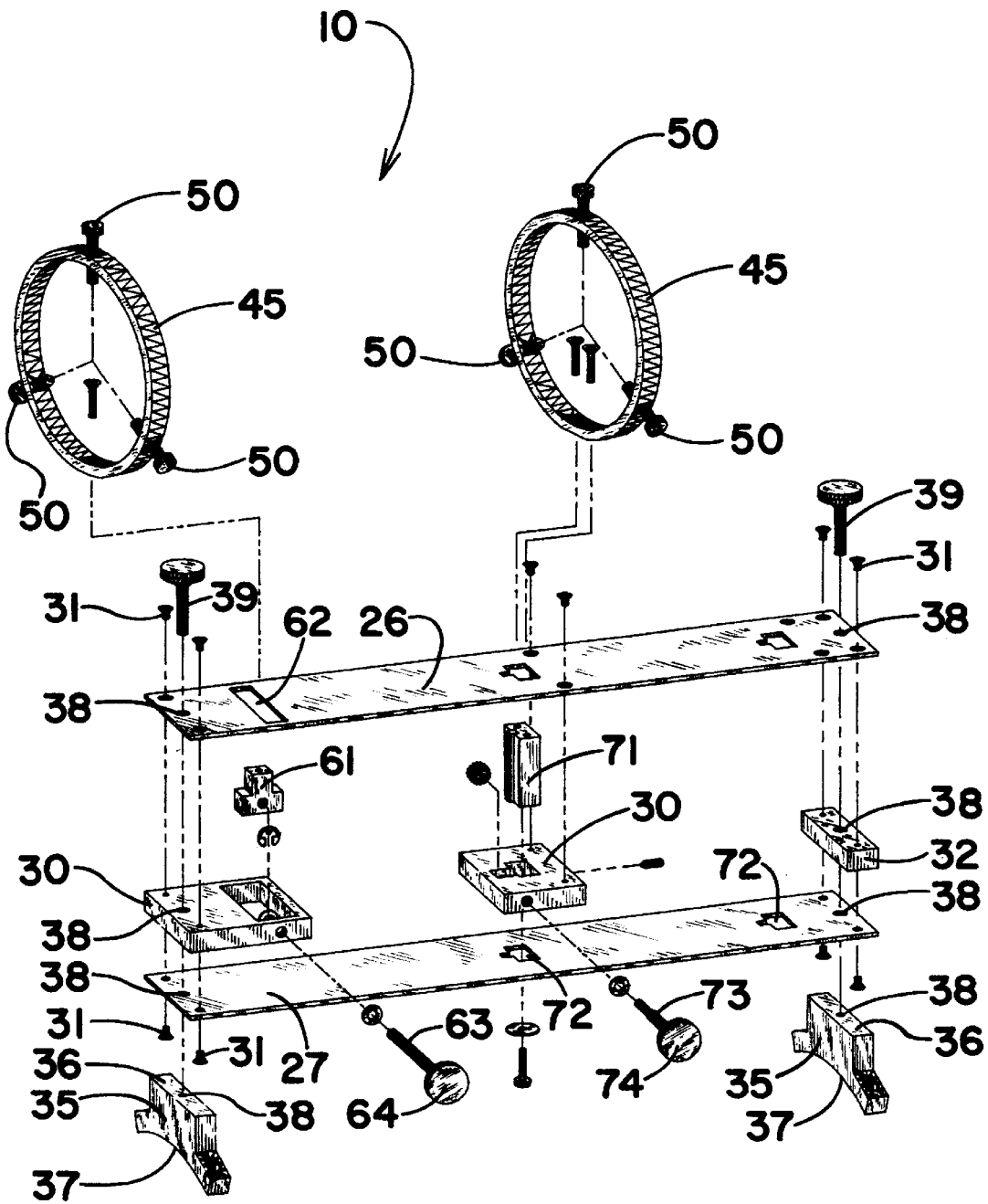
FIG. 2 is an exploded perspective side view of the guide scope mount of the present invention.

With reference to the drawings, and in particular to FIGS. 1 and 2, the guide scope mounting system is generally indicated by reference number 10. The guide scope mounting system 10 includes a mounting base 20 secured to a primary telescope used for astronomical viewing or photography. The guide scope holder 40 supports the guide scope (not shown), and the holder is fastened to means for individual horizontal and/or vertical adjustment of the guide scope holder 40, and guide scope held therein, relative to the mounting base 20. The individual adjusting means include a first horizontal adjustment means 60 and a second vertical adjustment means 70. The horizontal and/or vertical adjustment of the guide scope relative to the primary telescope allows the guide scope to focus on a bright star used as a reference point to maintain the primary telescope on a distant deep space object.

Base of the Mount

The base of the mount includes a generally rectangular planar base member 25 with top 26 and bottom 27 plates. A pair of control rod blocks 30 are fastened between the top 26 and bottom 27 plates of the base member 25, one near each end, by a plurality of threaded fasteners 31. A spacer block 32 is also positioned between the top 26 and bottom 27 plates. The control rod blocks 30 are also generally rectangular in shape with flat surfaces. To the bottom plate 27 of the planar base member 25 is secured primary telescope mounting blocks 35. The mounting blocks 35 have a flat surface 36 which contacts the flat surface of the bottom plate 27, and an opposite slightly curved surface 37 which matches the curvature of the primary telescope (not shown), which is generally round. The planar base member 25, the attached control blocks 30 and spacer block 32, and telescope mounting blocks 35, contain a pair of co-linear apertures 38 which each receive threaded fasteners 39 that thread into tapped holes in the primary telescope to securely fasten the base of the mount 20 thereto.

Guide Scope Holder

The guide scope is held in position by the guide scope holder 40 positioned above the top plate 26 of the planar base member 25. The guide scope holder 40 comprises a pair of retainer rings 45 with longitudinal axes oriented parallel to the planar base member 25, the rings held in position by adjusting means described below. Each retaining ring member 45 has flexible and adjustable attaching means for securing the guide scope concentrically mounted within both ring members. The flexible and adjustable attaching means comprises at least three adjusting hold down screws 50 for each ring member 45. Each screw 50 is oriented radially inward around each ring member for holding the guide scope therein. The hold-down screws 50 are preferably made of a flexible synthetic polymeric material such as nylon.

Adjusting Means

The guide scope adjusting means comprises a first horizontal adjusting means 60 and a second vertical adjusting means 70. The first horizontal adjusting means 60 includes a first retainer ring support post 61 that is generally rectangular in cross section. The support post 61 is fastened at one end to the outer surface of one retainer ring 45 and extends perpendicular to the planar base member 25 into a generally rectangular aperture 62 in the upper plate 26 of the base member 25 and the underlying control mounting block 30. A threaded control shaft 63 extends from exterior the control block 30, down the long axis of the rectangular aperture therein, and into the opposite side of the block 30. The control shaft 63 passes through a threaded hole in the support post 61, the hole positioned a selected distance from the end of the support post 61 connected to the retainer ring 45. The end of the control shaft 63 exterior the control block 30 contains an enlarged knob end 64 for easy rotation of the rod. Thus, by rotating the threaded control shaft 63, the intermeshing threads in the threaded aperture in the support post member cause the support post 61, and attached retainer ring 45, to move horizontally within the aperture 62 in the base member 25, thus providing horizontal adjustment of one end of the retained guide scope.

The second vertical adjusting means 70 includes a first retainer ring support post 71 that is generally rectangular in cross section. The support post 71 is fastened at one end to the outer surface of the other retainer ring 45 and extends perpendicular to the planar base member 25 into a generally rectangular aperture 72 in both the top plate 26 and bottom plate 27 of the base member 25 and the interior control mounting block 30. The aperture 72 is sized to be only slightly larger than the cross section of the support post 71. A threaded control shaft 73 extends from exterior the control block 30, along one side of the rectangular aperture therein, and into the opposite side of the block 30. The threads of control shaft 73 mesh with teeth on one surface of the support post 71, the teeth extending a selected distance along one side of the support post 71 end connected to the retainer ring 45. The end of the control shaft 73 exterior the control block 30 contains an enlarged knob end 74 for easy rotation of the rod. Thus, by rotating the threaded control shaft 73, the intermeshing teeth on the side of the support post member cause the support post 71, and attached retainer ring 45, to move vertically within the aperture 72 in the base member 25, thus providing vertical adjustment of one end of the retained guide scope.

In a further embodiment of the invention, a second pair of apertures 72 for the vertical adjusting means are present in the top 26 and bottom 27 plates of base member 25. These additional vertical adjusting apertures 72 are positioned closer to the horizontal adjusting means to accommodate a shorter guide scope. The vertical adjusting means is shown positioned in these second pair of apertures in FIG. 2. The spacer block 32 maintains the spacing of the top and bottom plates, as well as providing a stable base for the scope mount.

The guide scope is an essentially rigid tube with lenses contained therein. The guide scope should not be subjected to excessive mechanical stress in order to maintain the proper alignment of the optical lenses within. Mounting the guide scope within the pair of retaining rings 45 using the hold-down screws 50 must maintain the guide scope in a fairly rigid orientation relative to the primary telescope. Once mounted, the guide scope may not be aimed correctly to track a bright guide star during the course of observation. The horizontal and vertical adjustment means of the guide scope mount provide such an adjustment by movement of the individual guide scope holders. The use of a synthetic polymer material for the hold-down screws 50 provides the necessary support to maintain the guide scope in a fairly rigid orientation relative to the primary telescope. The hold-down screws 50 also allowing a certain degree of flexibility between the guide scope and the ring members 45 when small horizontal or vertical adjustments are made using the threaded control shafts (63, 73) connected to each support post member (61, 71). The hold-down screws 50 flex slightly as vertical and/or horizontal adjustments are made to the guide scope, yet maintain a steady orientation between guide scope and primary telescope.

While the invention has been particularly shown and described with reference to a preferred embodiment thereof, it will be understood by those skilled in the art that various changes in form and details may be made therein without departing from the spirit and scope of the invention.

I claim:

1. A guide scope mounting system for a telescope comprising;
   (a) a planar base platform member with top and bottom surfaces;
   (b) means for securing said base platform member to a telescope with bottom surface adjacent thereto, said securing means comprising a pair of mounting blocks, each with a flat surface contacting said base platform member and a curved surface contacting the telescope, and a pair of threaded fastener, each one passing through concentric apertures in said base platform member and one mounting block to secure said base member and mounting blocks to the telescope;
   (c) a pair of generally circular retaining ring members with longitudinal axis there through, said ring members positioned above said top surface of said platform member with longitudinal axis parallel thereto, each ring member having flexible attachment means for securing a guide scope concentrically mounted within both ring members; and
   (d) adjusting means between said base platform member and said retaining ring members, including a first adjusting means for movement of the longitudinal axis of a first ring member parallel to said base platform member, and a second adjusting means for movement of the longitudinal axis of a second ring member perpendicularly to said base platform member, whereby the orientation of a guide telescope mounted concentrically within said pair of ring members is changed relative to said platform member secured to the telescope by said adjusting means.

2. A system according to claim 1 further comprising;
   (e) a telescopic guide scope member mounted concentrically within said pair of ring members.

3. A system according to claim 1 wherein said flexible attachment means for securing a guide scope concentrically within both ring members comprises at least three adjusting screw members attached to each ring member, each screw member oriented radially inward around each ring member, for holding a guide scope therein.

4. A system according to claim 3 wherein said flexible adjusting screw members are made of a synthetic polymeric material.

5. A system according to claim 4 wherein said synthetic polymeric material is nylon.

6. A guide scope mounting system for a telescope comprising;
   (a) a planar base platform member with top and bottom surfaces;
   (b) means for securing said base platform member to a telescope with bottom surface adjacent thereto;
   (c) a pair of generally circular retaining ring members with longitudinal axis there through, said ring members positioned a first selected distance apart and above said top surface of said platform member with longitudinal axis parallel thereto, each ring member having flexible attachment means for securing a guide scope concentrically mounted within both ring members;
   (d) first adjusting means between said base platform member and a first ring member comprising a first support post member fastened to said first ring member, said first support post member extending perpendicularly to said planar base platform member and positioned within a first generally rectangular aperture therein, said first support post member holding said first ring member a constant distance above said base platform member, and means for horizontally moving said first support post member within said first rectangular aperture for movement of the longitudinal axis of said first ring member parallel to said base platform member,
   (e) second adjusting means between said base platform member and a second ring member comprising a second support post member fastened to said second ring member, said second support post member extending perpendicularly to said planar base platform member and positioned within a second generally rectangular aperture therein, said second support post member holding said second ring member a variable distance above said base platform member, and means for vertically moving said second support post member within said second rectangular aperture, thereby moving the longitudinal axis of said second ring member perpendicularly to said base platform member, whereby the orientation of a guide telescope mounted concentrically within said pair of ring members is changed relative to said platform member secured to the telescope by said first and second adjusting means; and
   (f) a third rectangular aperture in said base member for positioning said second vertical adjusting means and second ring member attached thereto a second selected distance from said first horizontal adjusting means and first ring member attached thereto.

7. A system according to claim 6 further comprising;
   (g) a telescopic guide scope member mounted concentrically within said pair of ring members.

8. A system according to claim 6 wherein said flexible attachment means for securing a guide scope concentrically within both ring members comprises at least three adjusting screw members attached to each ring member, each screw member oriented radially inward around each ring member, for holding a guide scope therein.

9. A system according to claim 8 wherein said flexible adjusting screw members are made of a synthetic polymeric material.

10. A system according to claim 9 wherein said synthetic polymeric material is nylon.

* * * * *